US006986466B2

(12) United States Patent
Vincent

(10) Patent No.: US 6,986,466 B2
(45) Date of Patent: Jan. 17, 2006

(54) DATA-PROCESSING SYSTEM

(75) Inventor: Yannick Vincent, Le Mans (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 318 days.

(21) Appl. No.: 10/015,965

(22) Filed: Nov. 30, 2001

(65) Prior Publication Data

US 2002/0130177 A1 Sep. 19, 2002

(30) Foreign Application Priority Data

Dec. 5, 2000 (FR) .................................. 00 15749

(51) Int. Cl.
*G06K 19/06* (2006.01)
(52) U.S. Cl. ..................................... 235/492; 235/487
(58) Field of Classification Search ................ 235/492, 235/487; 714/824, 763, 10, 38
See application file for complete search history.

(56) References Cited

U.S. PATENT DOCUMENTS

| | | | |
|---|---|---|---|
| 5,978,822 A * | 11/1999 | Muwafi et al. ............. | 708/209 |
| 6,023,705 A * | 2/2000 | Bellinger et al. ........... | 707/200 |
| 6,299,069 B1 * | 10/2001 | Shona ........................ | 235/492 |
| 6,377,356 B2 * | 4/2002 | Sakamoto et al. .......... | 358/1.14 |
| 6,574,776 B1 * | 6/2003 | Chiang ....................... | 714/800 |

FOREIGN PATENT DOCUMENTS

EP 0407177 A2 9/1991

OTHER PUBLICATIONS

Van Rensburg et al, System for Conducting Commercial Transactions, Jan. 2, 2003, United States Patent Application Publication.*
IC Family Specification, PCF5087X, Philips Semiconductors, Objective Specification 2.8. Aug. 13, 1999, pp. 69-78.

* cited by examiner

*Primary Examiner*—Diane I. Lee
*Assistant Examiner*—Kimberly D. Nguyen
(74) *Attorney, Agent, or Firm*—Larry Liberchuk

(57) ABSTRACT

A data-processing system comprises a microprocessor, a communication device communicating with an electronic module intended to apply a convention signal to the microprocessor, and a hardware circuit allowing inversion or no inversion of the order of bits of a word as a function of the value of the convention signal during transfer of the word between the electronic module and the microprocessor. Such a system allows a time gain during the operation of converting the bits of a word as a function of the convention used, which is beneficial for the real-time constraint. The system concerned may be used, for example, in a terminal using one or more cards of the SIM type, such as a mobile phone.

9 Claims, 6 Drawing Sheets

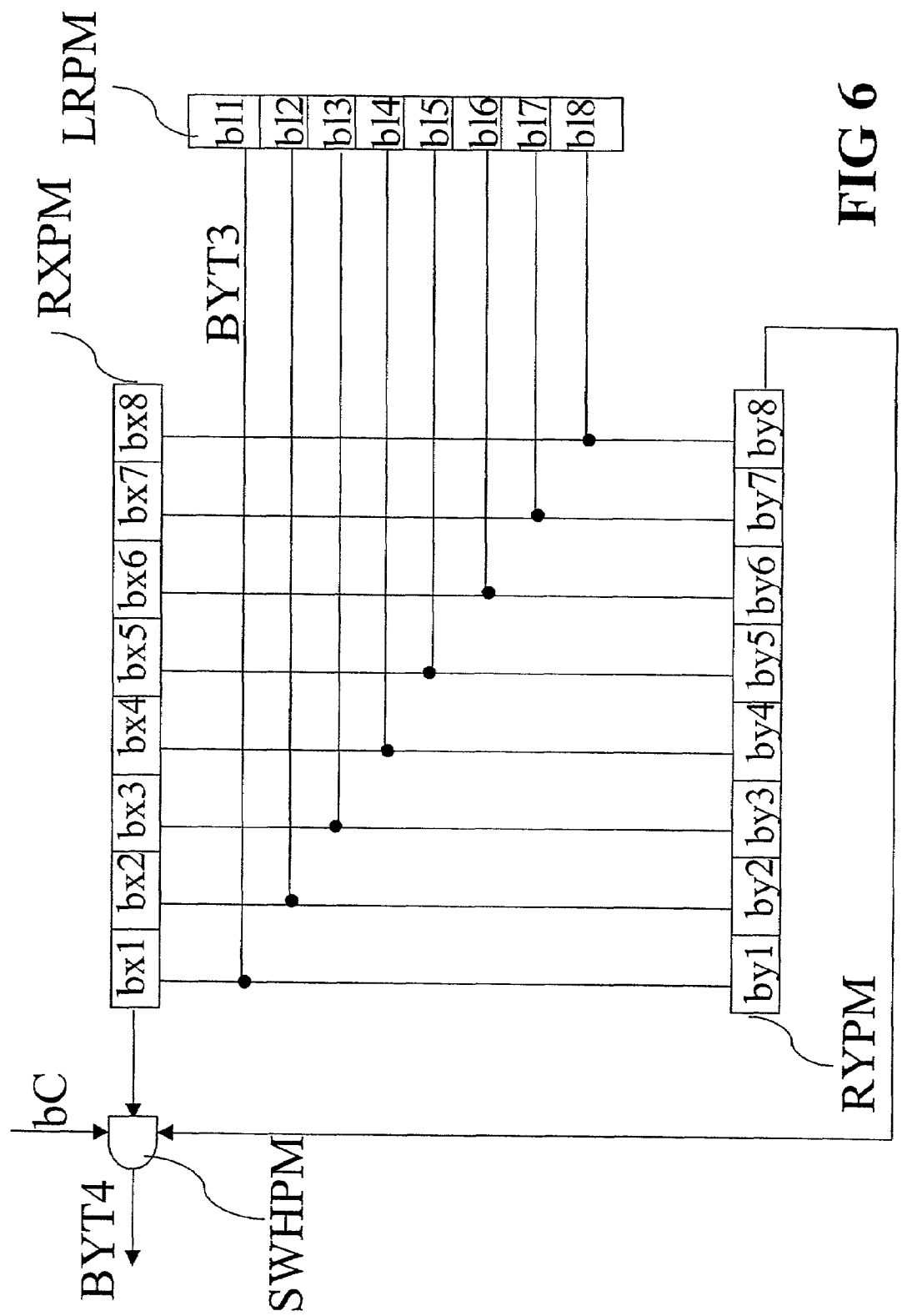

DATA-PROCESSING SYSTEM

FIELD OF THE INVENTION

The invention relates to a data-processing system comprising a microprocessor and a communication device communicating with an electronic module intended to send a convention signal to the microprocessor. The invention may be used in the systems using an electronic module, such as mobile phones, or bank applications. In this case, the electronic module is generally constituted by a card of the SIM type (SIM is the abbreviation of Subscriber Identity Module).

DESCRIPTION OF THE PRIOR ART

An electronic module generally takes the form of a microprocessor smart card which is inserted into a terminal or is present in this terminal. In a system using such an electronic module, a communication device allows communication of data between the electronic module and the microprocessor of the system.

The typical structure of a communication device, such as is used in the printed circuit PCF5087x, in which the electronic module is a SIM card, comprises a software unit and a register device. In this device, the time for performing an operation plays an important role as far as the real-time constraint is concerned. The software operation associated with the communication device is critical for this real-time constraint because it increases the time for processing certain operations.

SUMMARY OF THE INVENTION

It is an object of the invention to allow a reduction of time for processing operations.

According to the invention, in addition to a microprocessor and a communication device, a data-processing system also comprises a hardware circuit allowing inversion or no inversion of the order of bits of a word as a function of the value of the convention signal during transfer of this word between the electronic module and the microprocessor.

The invention takes the following aspects into consideration. During communication of data between the electronic module and the microprocessor, there are two conventions, direct and indirect, the convention used being dependent on the type of electronic module. These two conventions exist for historical reasons and are specified in the standard ISO7816-3. When the direct convention is used, the order of bits of a word sent by the electronic module must remain unchanged in order that this word can be processed by the microprocessor. When the indirect convention is used, the order of bits of a word sent by the electronic module must be inverted so that this word can be processed by the microprocessor. This operation necessitates a processing operation by a processing device which must be present in all the systems using an electronic module, because, on the one hand, the type of electronic module which is present or is inserted into the system is not known a priori and, on the other hand, several electronic devices of different types may be present in or inserted into the same system.

According to the prior art, the processing device allowing inversion or no inversion of the order of bits of a word as a function of the convention during transfer of this word between the electronic module and the microprocessor has the following characteristic features. The words exchanged between the electronic module and the microprocessor are 8-bit words. When the electronic module sends the data to the microprocessor, the first word sent is a word TS of 8 bits which indicates if either the direct or the indirect convention is used. A software unit situated between the electronic module and the microprocessor detects, thanks to TS, the convention used. This software unit comprises a table of 256 words of 8 bits which comprises, for each 8-bit word, its equivalent in the indirect convention, i.e. with the order of bits inverted. When the detected convention is the direct convention, the software unit transmits the word received from the electronic module to the microprocessor without changing this word. When the indirect convention is detected, the software unit transmits the equivalent in the indirect convention of the word received from the electronic module to the microprocessor. The words transmitted to the microprocessor are processed by the register device within the communication unit of the microprocessor. When the data are transferred from the microprocessor to the electronic module, the principle is the same as that described above. This processing device requires a software unit which increases the duration of the processing operation during communication of data between the electronic module and the microprocessor, which is critical for the real-time constraint.

The following principle allows a reduction of the processing time caused by the existence of two conventions during the transfer of words between the electronic module and the microprocessor. This processing operation is realized by a hardware circuit (as opposed to "software" when the processing operation is performed by a software unit). When the words are transferred from the electronic module to the microprocessor, the 8-bit words transmitted by the electronic module are loaded into a transfer register device which comprises two shift registers, one on the left and the other on the right. This transfer register device is situated in the communication device. A word B (Bytes) of 8 bits loaded into the transfer register device is loaded into the right shift register so as to give a word RB and into the left register so as to give a word LB. The word RB is strictly identical to the word B while the order of bits of the word LB is inverted with respect to the order of bits of the word B. A convention bit C is derived from the word TS transmitted by the electronic module during the transfer of data between this electronic module and the microprocessor. This convention bit C controls a selection circuit which is situated between the right shift register and the left shift register. As a function of the nature of the convention, direct or indirect, this selection circuit allows loading of the word RB or the word LB into a latched register device which is present in the communication unit of the microprocessor. When the data are transferred from the microprocessor to the electronic module, the 8-bit words contained in the latched register device are loaded into the right shift register and into the left shift register of the transfer register device of the communication device. As a function of the convention, another selection circuit controlled by the convention bit C allows selection of either the word stored in the right shift register or the word stored in the left shift register, which word will be sent to the electronic module. A time gain with respect to the processing operation performed by the software unit can be obtained by this hardware circuit, which time gain will be higher as the number of words exchanged per second between the electronic module and the microprocessor is higher.

These and other aspects of the invention are apparent from and will be elucidated, by way of non-limitative example, with reference to the embodiment(s) described hereinafter.

BRIEF DESCRIPTION OF THE DRAWINGS

FIG. 6 illustrates an embodiment of a hardware circuit for transferring data from a microprocessor to an electronic module.

DESCRIPTION OF PREFERRED EMBODIMENTS

Figure 1:
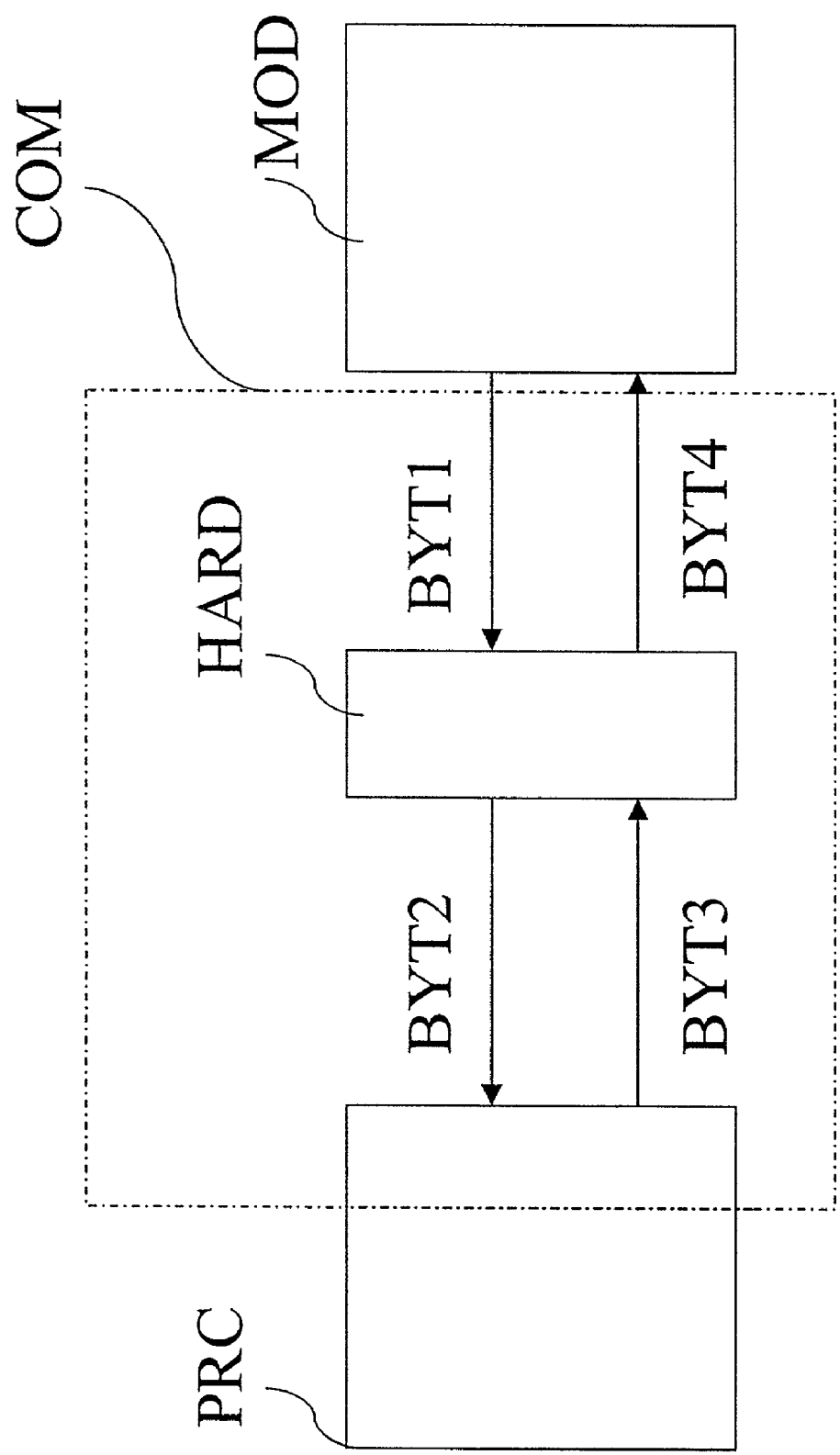
FIG. 1 is a diagram illustrating the characteristic features of the invention.

FIG. 1 illustrates characteristic features of the invention, as described hereinbefore. A data-processing system comprises a communication device [COM] communicating with an electronic module [MOD], a hardware circuit [HARD] and a microprocessor [PRC].

The electronic module [MOD] is present in or inserted into a terminal and comprises information relating to the subscriber. For example, the electronic module [MOD] allows control of the memory dedicated to the user, integration of security mechanisms or realization of payments from a distance. In order to process the information comprised in the electronic module [MOD], the terminal comprises the microprocessor [PRC] which exchanges data with the electronic module [MOD] via the communication device [COM]. For the exchange of data, there are two conventions, a direct and an indirect convention. These two conventions can be taken into account by the circuit [HARD] during an exchange of data between the electronic module [MOD] and the microprocessor [PRC]. When a first data word [BYT1] is transmitted from the electronic module [MOD] to the microprocessor [PRC], it is processed by the hardware circuit [HARD] which transmits a second data word [BYT2] to the microprocessor. In the case where the direct convention is used, the second data word [BYT2] is identical to the first data word [BYT1]. In the case where the indirect convention is used, the order of bits of the second data word [BYT2] is inverted with respect to the order of bits of the first data word [BYT1]. When a third data word [BYT3] is transmitted from the microprocessor [PRC] to the electronic module [MOD], it is processed by the hardware circuit [HARD] which transmits a fourth data word [BYT4] to the electronic module [MOD]. In the case where the direct convention is used, the fourth data word [BYT4] is identical to the third data word [BYT3]. In the case where the indirect convention is used, the order of bits of the fourth data word [BYT4] is inverted with respect to the order of bits of the third data word [BYT3].

Figure 2:
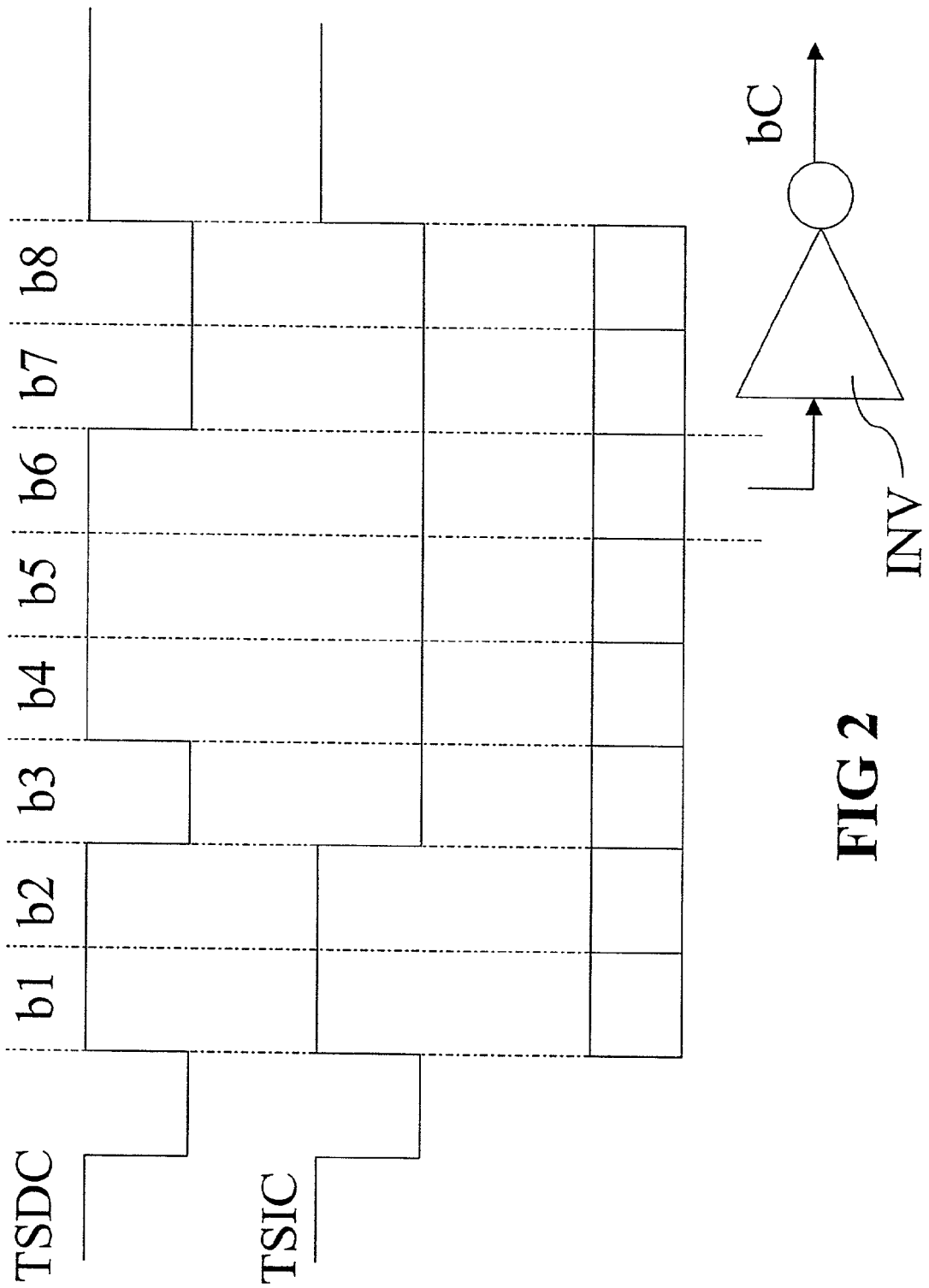
FIG. 2 illustrates a signal used for detecting the convention, as well as for generating the convention bit.

FIG. 2 illustrates a direct convention signal [TSDC] and an indirect convention signal [TSIC] transmitted by an electronic module during communication of data with a microprocessor. Each of these signals is a word of 8 bits enumerated first to eighth [b1–b8]. The bits [b4], [b5] and [b6] are coded for the convention. When the bits [b4], [b5] and [b6] have a value of 1, the direct convention is used. When the bits [b4], [b5] and [b6] have a value of 0, the indirect convention is used.

FIG. 2 also illustrates how a convention bit [bC] is generated from the signal [TSDC] or from the signal [TSIC]. The bit [b6] is applied to the input of an inverter [INV]. The output of this inverter [INV] is the convention bit [bC]. This convention bit [bC] has the value of 0 when the direct convention is used and 1 when the indirect convention is used.

Figure 3:
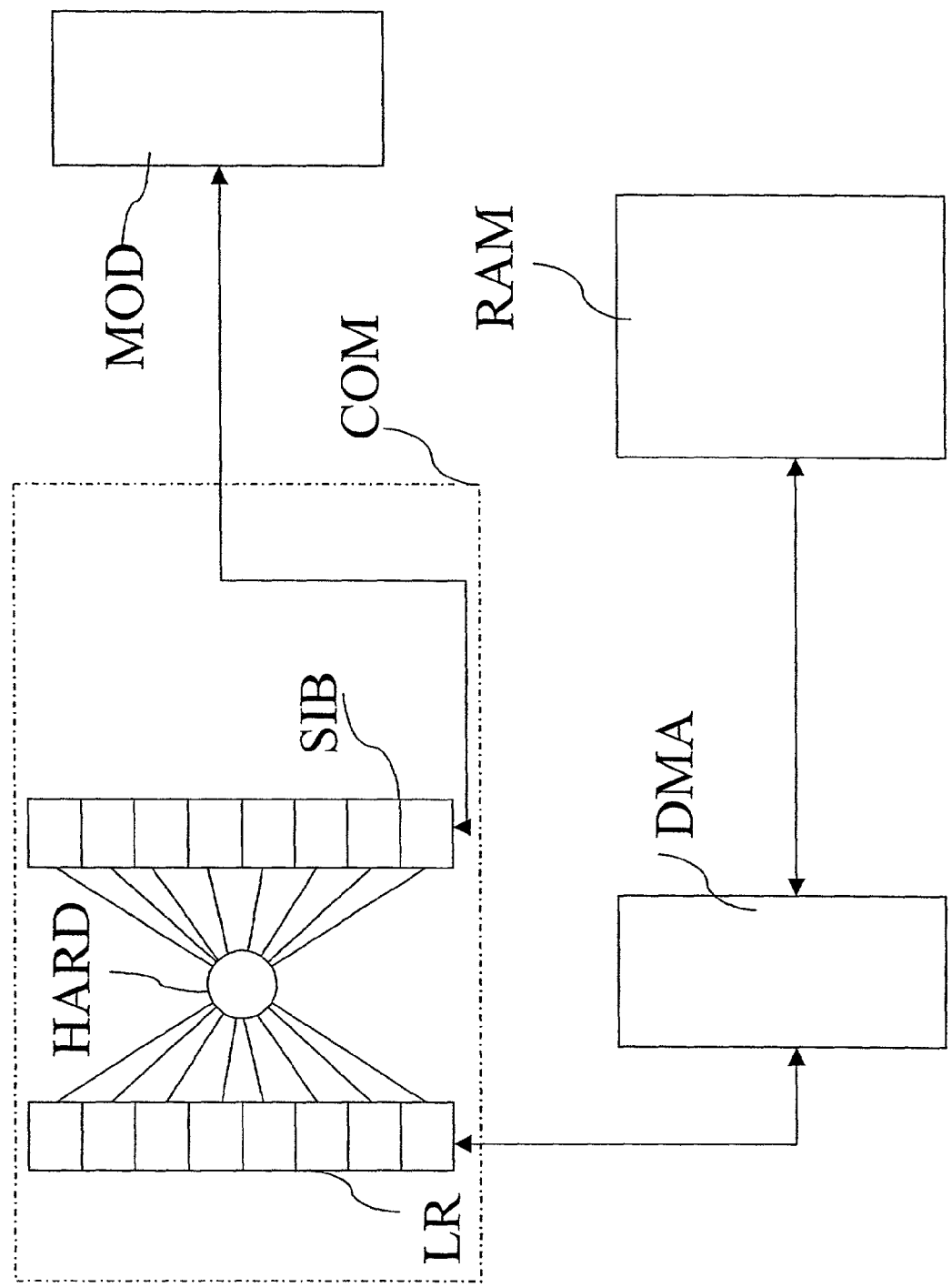
FIG. 3 is a block diagram illustrating the use of the invention in a system for transferring data between an electronic module and a random access memory.

FIG. 3 illustrates the use of the invention in a system for transferring data between an electronic module [MOD] and a random access memory. The data transfer system comprises a communication unit [COM] comprising a transfer register device [SIB], a latched register [LR] and a hardware circuit [HARD], a direct access memory [DMA] and a random access memory [RAM].

When the data is transferred from the electronic module [MOD] to the random access memory [RAM], a word of 8 bits is transmitted in series from the electronic module [MOD] to the transfer register device [SIB], one of whose roles is to effect a series-parallel conversion. The hardware circuit [HARD] allows inversion or no inversion of the order of bits of the word at the output of this transfer register device [SIB] as a function of the convention used. The operation of this hardware circuit [HARD] will be described in greater detail with reference to FIGS. 4, 5 and 6. The word is sent in parallel to the latched register [LR] whose role is to receive the words from the transfer register device [SIB] before these are used by the random access memory [RAM]. The direct access memory [DMA] extracts the word stored in the locked register [LR] in order to send it to the random access memory [RAM]. When the data is transferred from the random access memory [RAM] to the electronic module [MOD], the principle is the same as described above. In this case, one of the roles of the transfer register device [SIB] is to realize a parallel-series conversion.

Figure 4:
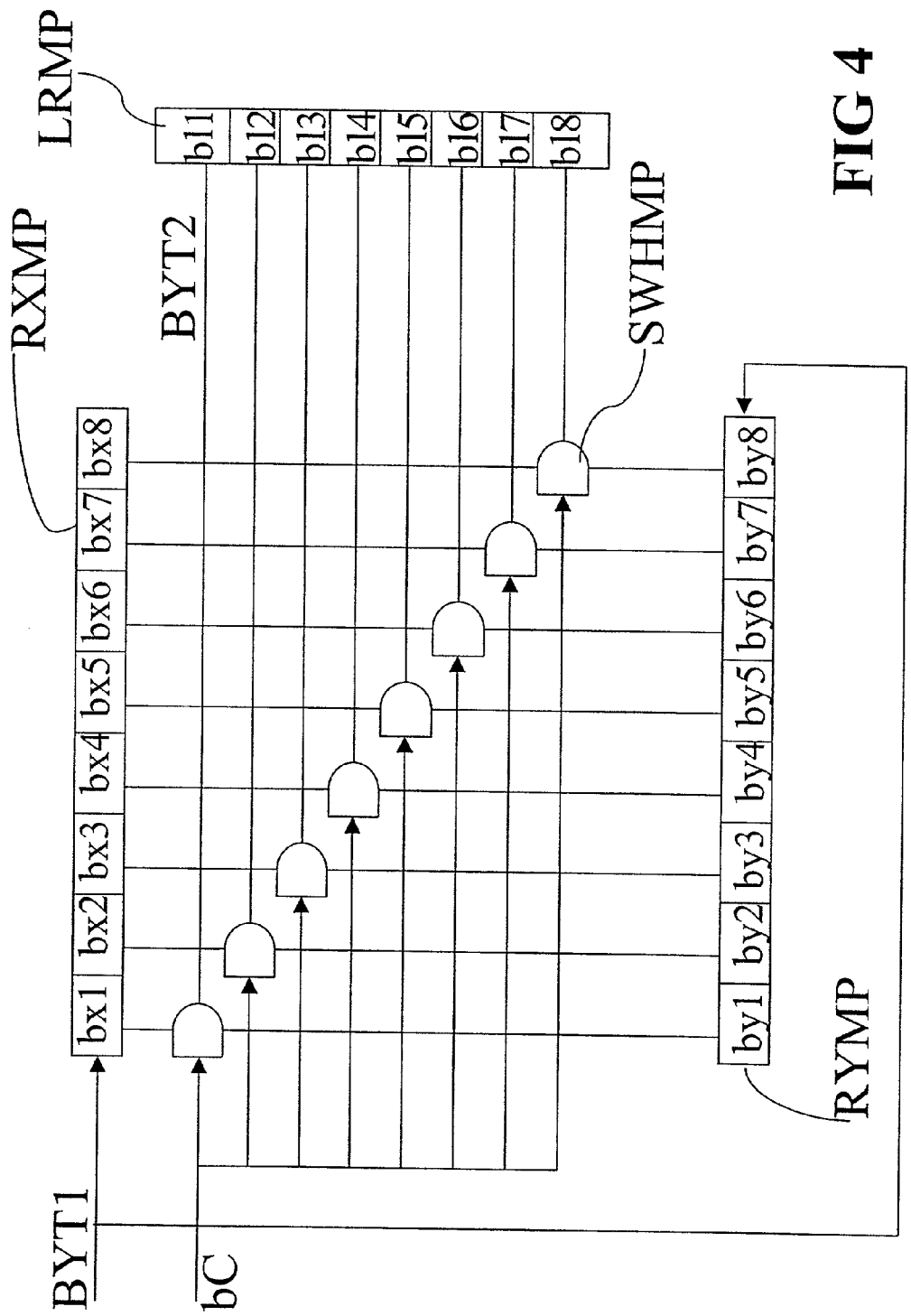
FIG. 4 illustrates an embodiment of a hardware circuit for transferring data from an electronic module to a microprocessor.

FIG. 4 illustrates a hardware circuit for the transfer of data from an electronic module to a microprocessor. The hardware circuit comprises a right shift register module-microprocessor [RXMP], a left shift register module-microprocessor [RYMP], a latched register module-microprocessor [LRMP] and 8 module-microprocessor switches [SWHMP]. In the Figure, only one module-microprocessor switch [SWHMP] has been referenced for reasons of convenience. The 7 other module-microprocessor switches [SWHMP] are identical and represented by identical symbols.

The first data word [BYT 1] of 8 bits enumerated first to eighth (b1, b8) is transmitted in series by the electronic module to the transfer register device. It is then loaded into the right shift register module-microprocessor [RXMP] as well as into the left shift register module-microprocessor [RYMP]. The right shift register module-microprocessor [RXMP] is intended to comprise words of 8 bits enumerated first to eighth [bx1, bx8]. The left shift register module-microprocessor [RYMP] is intended to comprise words of 8 bits enumerated first to eighth [by1, by8]. When the first data word [BYT1] is loaded into the right shift register module-microprocessor [RXMP], the bit [bx1] is equal to the bit b1, the bit [bx2] is equal to the bit b2, and so forth, until bit [bx8], which is equal to bit b8. When the first data word [BYT1] is loaded into the left shift register module-microprocessor [RYMP], the bit [by1] is equal to the bit b8, the bit [by2] is equal to the bit b7, and so forth until the bit [by8], which is equal to the bit b1, i.e. the order of bits is inverted. The module-microprocessor switch [SWHMP] number n (n being an integral number between 1 and 8) has the convention bit [bC] for control and the bits bxn and byn as inputs. In the case where the direct convention is used, i.e. in the case where the convention bit [bC] has a value of 0, the output bsn of the module-microprocessor switch [SWHMP] number n is the bit bxn. In the case where the indirect convention is used, i.e. in the case where the convention bit [bC] has a value of 1, the output bsn of the module-microprocessor switch [SWHMP] number n is the bit byn. The 8 bits enumerated first to eighth (bs1, bs8) constitute the second data word [BYT2]. Each bit bsn is loaded in parallel into the latched register module-microprocessor [LRMP] intended to comprise words of 8 bits enumerated first to eighth [bl1, bl8]. The bit bl1 is then equal to the bit bs1, the bit bl2 is equal to the bit bs2 and so forth until the bit bl8, which is equal to the bit bs8.

Figure 5:
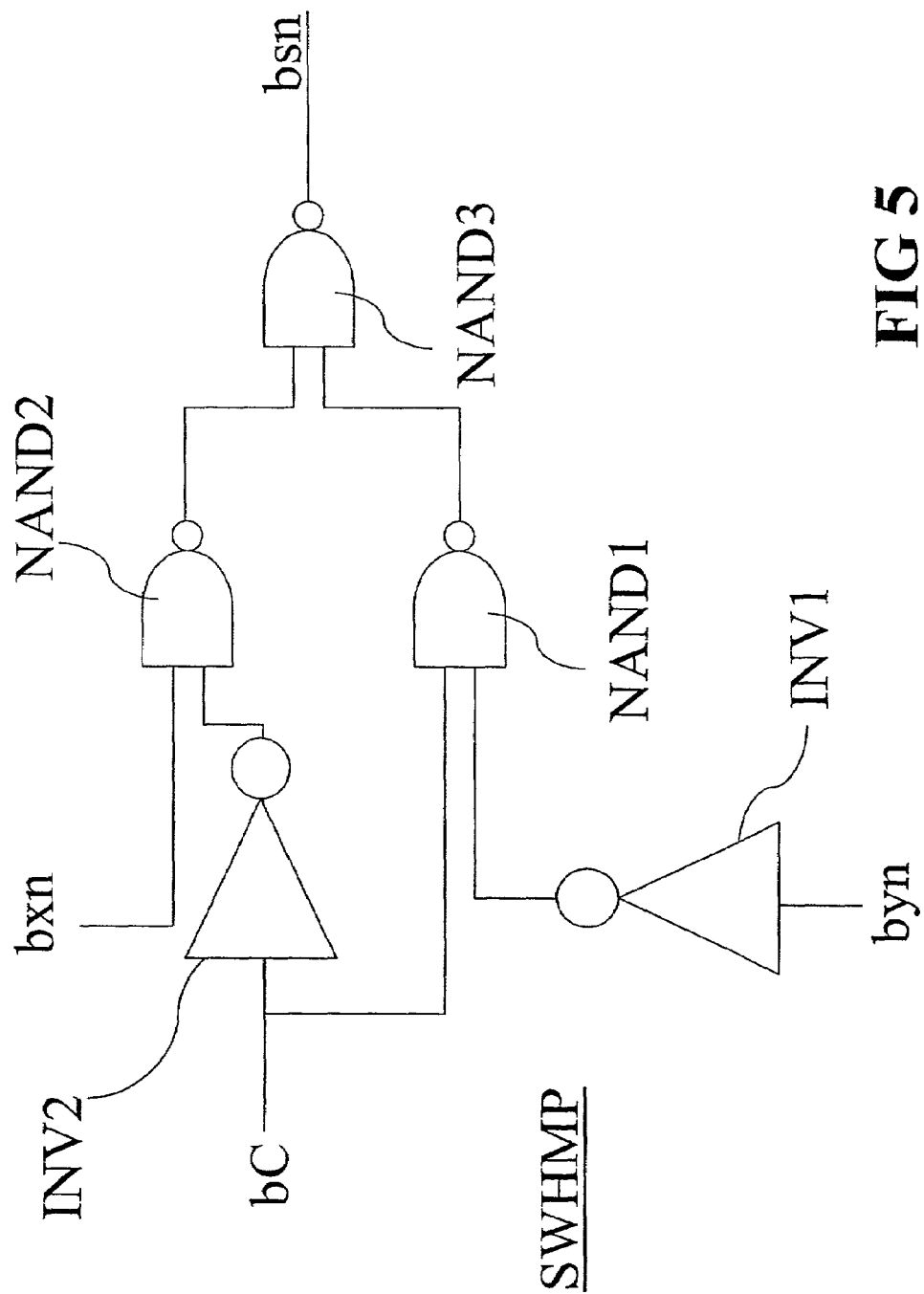
FIG. 5 illustrates an embodiment of a switch used in a hardware circuit for transferring data from an electronic module to a microprocessor.

FIG. 5 illustrates an example of a module-microprocessor switch [SWHMP] used in a hardware circuit for a transfer of data from an electronic module to a microprocessor. The module-microprocessor switch [SWHMP] comprises a first NAND gate [NAND1], a second NAND gate [NAND2], a third NAND gate [NAND3], a first inverter [INV1] and a second inverter [INV2].

This module-microprocessor switch [SWHMP] operates as follows. The bit [byn] passes through the first inverter [INV1]. The output of this first inverter [INV1] as well as the convention bit [bC] are applied to the inputs of the first NAND gate [NAND1]. The convention bit [bC] is applied to the input of the second inverter [INV2]. The output of this second inverter [INV2] as well as the bit [bxn] are applied to the inputs of the second NAND gate [NAND2]. The outputs of the first NAND gate [NAND1] and the second NAND gate [NAND2] are applied to the inputs of the third NAND gate [NAND3]. The output bit of this third NAND gate [NAND3] is the bit [bsn]. When the direct convention is used, the convention bit [bC] has a value of 0. The inverse logic value of bit [byn] as well as the convention bit [bC] which has a value of 0 are applied to the inputs of the first NAND gate [NAND1]. The output of the first NAND gate [NAND1] thus has a value of 1, irrespective of the value of the bit [byn]. The inverse logic value of the convention bit [bC], i.e. 1, as well as the bit [bxn] are applied to the inputs of the second NAND gate [NAND2]. The output of the second NAND gate [NAND2] is thus equal to the inverse logic value of the bit [bxn]. Consequently, the output of the third NAND gate [NAND3], i.e. the bit [bsn], is equal to the bit [bxn]. When the indirect convention is used, the convention bit [bC] has a value of 1. The inverse logic value of the bit [byn] as well as the convention bit [bC] which has a value of 1 are applied to the inputs of the first NAND gate [NAND1]. The output of the first NAND gate [NAND1] is thus equal to the bit [byn]. The inverse logic value of the convention bit [bC], i.e. 0, as well as the bit [bxn] are applied to the inputs of the second NAND gate [NAND2]. The output of the second NAND gate [NAND2] thus has a value of 1, irrespective of the value of the bit [bxn]. Consequently, the output of the third NAND gate [NAND3], i.e. the bit [bsn], is equal to the inverse logic value of the bit [byn].

The module-microprocessor switch [SWHMP] illustrated in this Figure allows inversion, at the same time, of the order and the value of the bits of a word when the indirect convention is used. Another switch allowing inversion of only the order of bits of a word may be derived from this module-microprocessor switch [SWHMP] by removing the first inverter [INV1].

FIG. 6 illustrates a hardware circuit for transfer of data from a microprocessor to an electronic module. The hardware circuit comprises a left shift register microprocessor-module [RXPM], a right shift register microprocessor-module [RYPM], a latched register microprocessor-module [LRPM] and a microprocessor-module switch [SWHPM].

The data word to be transmitted from the microprocessor to the electronic module is stored in the latched register microprocessor-module [LRPM]. This data word is the third data word [BYT3] of 8 bits enumerated first to eighth [bl1, bl8]. For transmission to the electronic module, this word is first loaded in parallel into the left shift register microprocessor-module [RXPM] as well as into the right shift register microprocessor-module [RYPM]. The left shift register microprocessor-module [RXPM] is intended to comprise words of 8 bits enumerated first to eighth [bx1, bx8]. The right shift register microprocessor-module [RYPM] is intended to comprise words of 8 bits enumerated first to eighth [by1, by8]. When the third data word [BYT3] is loaded into the left shift register microprocessor-module [RXPM], the bit [bx1] is equal to bit b1, the bit [bx2] is equal to bit b2, and so forth until the bit [bx8] which is equal to bit b8. When the third data word [BYT3] is loaded into the right shift register microprocessor-module [RYPM], the bit [by1] is equal to bit b1, the bit [by2] is equal to bit b2 and so forth until the bit [by8], which is equal to bit b8. The microprocessor-module switch [SWHPM] has the convention bit [bC] for control and receives in series, at one of its inputs, the data word stored in the left shift register microprocessor-module [RXPM], which is identical to the third data word [BYT3], and, at the other input, the data word stored in the right shift register microprocessor-module [RYPM], of which the order of bits is inverted with respect to the order of bits of the third data word [BYT3]. This microprocessor-module switch [SWHPM] processes the bits of each of its words one after the other, i.e. it has the bit [bx1] and the bit [by8] as its inputs, then the bit [bx2] and the bit [by7], and so forth until the bit [bx8] and the bit [by1]. This microprocessor-module switch [SWHPM] is identical to the module microprocessor switch [SWHMP] described with reference to FIG. 4. Let it be assumed that the microprocessor-module switch (SWHPM] has the bit bxn and the bit by(9-n) as its inputs, for example, b3 and b6. In the case where the direct convention is used, i.e. in the case where the convention bit [bC] has a value of 0, the output of the microprocessor-module switch [SWHPM] is the bit bxn. In the case where the indirect convention is used, i.e. in the case where the convention bit [bC] has a value of 1, the output of the microprocessor-module switch [SWHPM] is the inverse logic value of the bit by(9-n). The 8 consecutive output bits of the microprocessor module switch [SWHPM] constitute the fourth data word [BYT4]. The remark made at the end of the description of FIG. 5 similarly applies in this case: it is possible to use another microprocessor-module switch in order to invert only the order of bits of a word when the indirect convention is used.

The data-processing system shown in FIGS. 3 to 6 is an example of using the characteristic features illustrated in FIG. 1.

The description above with reference to the Figures illustrates rather than limits the invention. It will be evident that there are numerous alternatives within the scope of the appended claims. In this respect, several remarks will be made in conclusion.

There are numerous ways of inverting or not inverting the order of bits of a word as a function of the convention during transfer of data between the electronic module and the microprocessor. FIGS. 3 to 6 only illustrate a possible embodiment in which 2 shift registers as well as a hardware circuit are used for realizing this function. It is possible to use other, possibly more complex circuits for realizing this function.

What is claimed is:

1. A data-processing system, comprising:
   a microprocessor [PRC];
   a communication device [COM] communicating with an electronic module [MOD] intended to send a convention signal to said microprocessor; and
   a hardware circuit [HARD] allowing an inversion of an order of bits of a word as a function of a value of the convention signal during a transfer of the word between said electronic module [MOD] and said microprocessor [PRC].

2. The data-processing system as claimed in claim 1, wherein said electronic module [MOD] is a Subscriber Identity Module card.

3. The data-processing system as claimed in claim 1, wherein said hardware circuit [HARD] allows inversion of the value of the bits of the word as a function of the value of the convention signal.

4. The data-processing system as claimed in claim 1, wherein said hardware circuit [HARD] includes
   a switch [SWHMP, SWHPM];
   a right shift register [RXMP, RYPM] electrically connected to said switch; and
   a left shift register [RYMP, RXPM] electrically connected to said switch.

5. A terminal, comprising;
   a microprocessor [PRC];
   a communication device [COM] communicating with an electronic module [MOD] intended to send a convention signal to said microprocessor; and
   a hardware circuit [HARD] allowing an inversion of an order of bits of a word as a function of a value of the convention signal during a transfer of the word between said electronic module [MOD] and said microprocessor [PRC].

6. The terminal as claimed in claim 5, wherein said electronic module [MOD] is a Subscriber Identity Module card.

7. The terminal as claimed in claim 5, wherein said hardware circuit [HARD] allows inversion of the value of the bits of the word as a function of the value of the convention signal.

8. The terminals as claimed in claim 5, wherein said hardware circuit [HARD] includes:
   a switch [SWHMP, SWHPM];
   a right shift register [RXMP, RYPM] electrically connected to said switch; and
   a left shift register [RYMP, RXPM] electrically connected to said switch.

9. A data-processing system, comprising:
   a hardware circuit [HARD];
   a communication device [COM] for communicating a convention signal and a word to said hardware circuit [HARD] from one of a microprocessor [PRC] and an electronic module [MOD]; and
   wherein said hardware circuit includes means for implementing one of a direct convention and an indirect convention of an order of bits of the word as a function of a value of the convention signal.

* * * * *